Patented Feb. 25, 1941

2,233,021

UNITED STATES PATENT OFFICE 2,233,021

PROCESS FOR SOLVENT MANUFACTURE

Joseph A. MacDonald, Jackson Heights, N. Y., assignor to Horace E. Hall, Laurel, Miss.

No Drawing. Application April 14, 1937, Serial No. 136,795

4 Claims. (Cl. 195—44)

This invention relates to the production of alcohols and acetone by a process involving fermentation and has for one of its objects the utilization of mashes of high carbohydrate concentration. By high concentration I mean from 2½% to 15% by weight of carbohydrate in the mash.

Another object of this invention is the utilization of residues resulting from butyl alcohol fermentations, such, for example, as those residues ordinarily rejected from beer-still distillations. In order to retain the acids in this residue, the mash, previous to distillation, may be treated with calcium or barium oxides, hydroxides or carbonates or other suitable basic material or mixtures capable of combining with the unconverted organic acids present in the final mash. After the customary distillation and removal of the volatile solvents, the residue contains varying proportions of salts of the organic acids corresponding to the basic materials added, such as calcium acetate, calcium butyrate, calcium lactate and the like. This residue without further purification or filtration may be used by me as an aid in butyl alcohol fermentations and will hereinafter be referred to as "mash residue."

Another object of this invention is the utilization of the alkali earth metal salts of organic acids, such as calcium acetate, calcium butyrate, and the like or mixtures of the same to aid in butyl alcohol fermentation of mashes of relatively high carbohydrate concentration. I have also obtained satisfactory results, in this connection, by using materials which are usually designated as buffers. These products include phosphate buffers and the like.

Another object of this invention is the utilization of the molasses normally discarded in the final refinement of cane sugar and which is unsuitable for fermentation. Similar lots of molasses are sometimes encountered in shipments from Java, Hawaii, Puerto Rico, Cuba and elsewhere. Such molasses is definitely characterized by its tendency to develop high acidities and therefore unfavorable pH ranges during butyl alcohol fermentations. Molasses of this type also frequently develops sluggish fermentations in which the acidity slowly continues to rise and only a relatively small portion of the organic acids so formed is converted into solvents.

In the past, butyl alcohol producing organisms when introduced into mashes containing 3% to 10% and upwards of carbohydrates by weight, have been incapable of consistently converting the major portion of the carbohydrates into useful solvents due perhaps to unfavorable pH conditions arising in the mash as the result of the considerable formation of intermediate organic acids such as acetic and butyric acids.

I have found that if in these concentrated mashes I incorporate a percentage of salts or mixtures of salts such as calcium acetate or calcium butyrate or a mixture of the same, the mash being otherwise prepared as is the custom, that the fermentation then proceeds in a vigorous manner and that relatively high solvent yields are thereby obtained.

In one manner of carrying my invention into effect I may proceed as follows: A known weight of fermentable carbohydrate-containing raw material is mixed with about an equal volume of water or in such proportion that its consistency allows of thorough agitation in the sterilizer and thereafter of ready flow through the usual pipe lines. In the case of cereal mashes such as corn meal, the sterilization treatment customarily resorted to requires their submission to a steam pressure of approximately 60 pounds for a period of 30 minutes or longer. In the case of saccharine mashes, such as blackstrap molasses, the mixture is usually sterilized under a steam pressure of 15 pounds or thereabouts for a period of 15 minutes or longer. If the raw material is deficient in available nitrogen there may be added to this preliminary mixture, preferably before sterilization, a portion of utilizable nitrogenous material. I may add a quantity of a salt or salts of organic acids either prior to, during or after sterilization or later during the fermentation, or the quantity to be added may be divided and added in several portions during the progress of the operation. In place of the salts or in combination therewith I may add portions of mash residue prepared as later described herein.

After sterilization the aqueous mixture may be diluted with ordinary tap water at such temperature that the final mash when reaching a consistency, by weight, of 3%, more or less, of carbohydrates, will have attained a temperature of approximately 37° C. to 40° C.

This mixture may be fermented by means of a butyl alcohol producing culture and the products of reaction recovered and refined by means of distillation.

The butyl alcohol producing cultures may be prepared by one of the several accepted methods in common usage. The organisms used and the methods of preparation are outlined in numerous publications and patents. Reference is made to U. S. Patents 1,315,585; 1,655,435; 1,933,683; 1,538,516; 1,385,888; etc.

The salts of organic acids or mash residue may be added to the mash previous to inoculation or later during the fermentation. They may be added as the solid salt, in aqueous solution or suspension or they may be incorporated in the freshly sterilized mash, portions of which are added to the fermentation mixture from time to time. The salt may even be produced in the fermenting mash by simple addition to the latter of a salt forming material such as the oxides, hydroxides, or carbonates of the alkali earth metals, provided the materials are capable of reacting with the organic acids present in the mash to form corresponding salts.

The addition to the fermenting mash of such salts and in such proportions is well governed by close observation of the pH. The optimum pH range for most butyl alcohol producing organisms appears to be 4.0 to 6.5. After the fermentation is well started as evidenced by vigorous gas evolution, the pH should assume values approximating 5.0. This favorable range should be maintained by previous or later additions of salts of organic acids, mash residue or other regulatory substances. I have observed that saccharine mashes containing principally invert sugar or sucrose or mixtures containing both—but relatively free from impurities—may ferment more satisfactorily where the pH range is maintained below 5.0 or at about 4.5 but generally speaking it appears most satisfactory to regard 4.7 to 5.3 as the most desirable range for maximum solvent production according to this invention.

The quantity of salt to be added will vary considerably depending upon several factors, such as the nature and amount of carbohydrate containing raw material used. I have found that in most cases the approximate limits of effectiveness appear to be between the limits of one gram of salt to five grams of carbohydrate and one gram of salt to one hundred grams of carbohydrate. Among the salts which I have used with good effect in my invention herein, are primarily the calcium salts of the relatively low aliphatic acids—as calcium propionate—and hydroxy acids—as barium lactate—and unsaturated acids—as calcium crotonate—and dibasic acids—as sodium allonate—etc., excluding certain salts which appear to exert a toxic or inhibitive effect upon the functioning of the desirable bacteria present—as sodium formate.

Mash residue as I prepare it is the cheapest and most effective agent for regulation of acidities, in high saccharine concentration mashes, and for the prevention of the establishment therein of unfavorable pH conditions.

One satisfactory means of preparing mash residue is described as follows:

The mash, immediately before distillation is titrated with 0.1 normal NaOH using thymol blue as an indicator and this titration figure is used as a basis of calculating the total apparent acid present in terms of acetic acid. An amount of calcium carbonate sufficient to react with this calculated amount of acid is added and the beer is then distilled in the customary manner. The residual slop from the beer still is returned to storage where portions may be withdrawn as needed and added to fresh unfermented mash in preparation. The pH of such residue is frequently found to be approximately 5.80 or thereabouts. Its buffering capacity in terms of 0.1 normal acetic acid is determined by electrometric titration of 10 ml. portions with 0.1 normal acetic acid over the range pH 4.80 to pH 5.80 or between whatever upper value is found to apply to the stored residue and pH 4.80. By this means the number of grams of acetic acid equivalent per unit volume of mash residue is determined.

I have found that calcium acetate in aqueous solution equivalent in concentration to one gram acetic acid in 400 ml. requires approximately 3.13 ml. of 0.1 normal acetic acid to reduce the pH of 10 ml. of such solution from approximately pH 6.40 to pH 4.80. With this determination as a standard for comparison I may figure the approximate buffering capacity of various dilutions of mash residue.

Mash residue as obtained by my methods is particularly suited for use as a buffering agent in molasses fermentations, since it contains not only organic acid salts but other effective buffering agents (possibly nitrogenous in nature) as well. It is particularly desirable to incorporate in molasses mashes materials of such nature that they are especially efficacious in maintaining pH values between 4.80 and 5.0 and that do not permit the accumulation at any time during the course of fermentation of free acid in sufficient concentration to cause a fall in pH to a value appreciably lower than 4.80. Mash residues as prepared by my methods are particularly effective in this connection.

In determining the proportion of buffer, calculated in terms of acetic acid equivalent, to be added to a given molasses in order to obtain maximum solvent yields, when using high concentrations of such molasses, I make an aqueous 5% mixture of such molasses plus added protein if such is to be used in the fermentation. This mixture is sterilized in the customary fashion, since sterilization seems to alter the starting pH value. The pH of this sterilized mixture is then determined and 10 ml. is titrated electrometrically with 0.1 normal acetic acid to the point where the pH reads 4.80. The number of ml. of 0.1 normal acetic acid required to bring about this lowering of the pH is noted.

It is assumed that in 5% molasses concentrations the mash, during the normal course of fermentation, will reach an approximate maximum free acidity of 5.50 ml. of 0.1 normal NaOH per 10 ml. of mash. From this assumed maximum acidity value I subtract the value 2.25 since this appears to represent the approximate amount of free acidity which can be tolerated in a 5% mash of suitable molasses. From the result thus obtained I subtract the above determined buffering power of 10 ml. of the 5% molasses mash to be used. The remainder resulting represents the estimated buffering power which I should add to each 10 ml. of the 5% molasses mash. Since one gram of acetic acid, as calcium acetate, in 400 ml. aqueous solution requires 3.13 ml. of 0.1 normal acetic acid per 10 ml. of solution, I can determine the amount of mash residue to be added in order to balance the total estimated. With this figure as a standard I prepare and inoculate several 5% molasses mashes, one with the calculated amount of mash residue, and the others with varying amounts more or less than the calculated amount. After fermentation these mashes usually reveal the amount of mash residue needed for the highest solvent yields. The amount thus derived is usually identical with or very close to that which I have previously calculated. It will be found that mashes containing either more or less buffering capacity than that determined as the correct amount will give lower solvent yields.

If I now desire to increase the molasses concentration I need only to add such amount of buffer as is proportionate to that amount added to the 5% concentrations.

While I have described a routine procedure frequently followed by me in determining the amounts of mash residue to be added to the fresh molasses mashes it is understood that I am not limited alone to this procedure.

Mash which has several times previously been treated with a suitable salt forming material and thereafter distilled and again used in fermentations is entirely suitable for repeated and continued use. Frequently the buffering qualities of such accumulative mash residues are increased and improved by this reuse and retreatment.

The following examples indicate three methods of application of my process in connection with some of the more important commercially obtainable raw materials, and are for illustrative purposes only and not for purposes of limitation.

*Example 1.*—180 grams of Cuban blackstrap molasses containing about 50% carbohydrates, were admixed with 4 grams of "cracklings" (commercial animal protein material) and 200 grams of water. To this was added 4.5 grams of acetic acid equivalent of acetate of lime and the mixture sterilized under 15 pounds steam pressure for 30 minutes. 1400 grams of tap water was now added to the sterilized mixture and the resulting temperature brought to 39° C. This prepared mash was then inoculated with approximately 50-90 ml. of a butyl alcohol producing culture and the whole allowed to ferment at 37° C. or thereabouts until gas evolution had substantially ceased. The culture was prepared as outlined in U. S. Patent 1,315,585.

After 72 hours gas evolution had substantially ceased and the finished mash was found to contain 8.64 grams of acetone; 14.40 grams of butyl alcohol and 2.34 grams of ethyl alcohol.

The pH of the final mash was 5.15. The initial pH was 6.3 and within 8 hours after inoculation this pH had dropped to 5.0 which value remained substantially constant throughout the fermentation.

*Example 2.*—270 grams of Cuban blackstrap molasses were mixed with 6 grams of "cracklings," 3 grams acetic acid equivalent of calcium propionate and 300 grams of water. The mixture was sterilized under 15 pounds steam pressure for 30 minutes. Approximately one-third of this mixture was mixed with 1200 grams of cool tap water which brought the temperature of the mixture to 38° C. This prepared mash was then inoculated with approximately 90 ml. of butyl alcohol producing culture and the whole maintained at about 37° C. After 24 hours of vigorous fermentation the remaining sterilized molasses concentrate was added to the fermenting mixture, bringing the total carbohydrate concentration up to 7.5% or to 15% by weight of the molasses. The fermentation proceeded without interruption and the pH remained throughout at approximately 5.1. At the end of 96 hours gas evolution had substantially ceased and analysis revealed the following amounts of solvents: 24.70 grams of butyl alcohol, 12.15 grams of acetone and 3.65 grams of ethyl alcohol.

The culture used in this example was prepared as set forth in United States Patent 1,655,435.

*Example 3.*—The fermentation residue from Example 1, was treated with calcium oxide in amount only sufficient to convert the residual acids as acetic acid and butyric acid into their corresponding calcium salts. This residue was then evaporated to a convenient volume and the pH was found to be approximately 5.80. It was determined that 10 ml. of this mash residue required 0.12 gram of acetic acid to reduce the pH to 4.80.

The molasses used in this example originated in the British West Indies. Preparation and sterilization of a 5% mash of this molasses revealed that 10 ml. of such mash required 1.20 ml. of 0.1 normal acetic acid to reduce the pH from its original value of 5.81 to pH 4.80. The following calculation was then made:

5.50 Assumed maximum free acidity of 10 ml. of 5% fermenting mash, in terms of 0.1 normal NaOH.
2.25 Free acidity value which apparently may be tolerated.

3.25 Difference or excess of free acid.
1.20 Buffering power of 10 ml. of 5% molasses used.

2.05 Difference or excess of free acid to be buffered by addition of mash residue.

Since one gram of acetic acid as calcium acetate in 400 ml. aqueous solution requires 3.13 ml. of 0.1 normal acetic acid to reduce the pH of a 10 ml. portion of the solution from 6.37 to pH 4.80 and since 10 ml. of mash residue requires 0.12 gram of acetic acid, it follows by the same reasoning, that 10 ml. of the mash residue will be equivalent to approximately 0.38 ml. of 0.1 normal acetic acid between the pH range 4.80 to 5.85. From the above calculation 2.05 is the additional requirement to maintain optimal pH conditions, therefore, approximately 54 ml. of mash residue per 400 ml. of 5% molasses mash will be required to balance the fermentation.

The total mash volume used in this example was 1800 ml., therefore, it required the addition of approximately 288 ml. of mash residue to make up the volume of mash at 5% by weight concentration of molasses. 180 grams or 10% was used therefore the amount of mash residue required was double that for 5% or 576 ml. This amount was added in the 1800 ml. of mash prepared. 4 grams of "cracklings" was added and the whole sterilized as usual. The mash was then inoculated and after 72 hours of fermentation gas evolution had ceased and analysis revealed the following: 19.53 grams of butyl alcohol, 8.82 grams of acetone and 3.15 grams of ethyl alcohol. The molasses contained 58% by weight of carbohydrates.

The culture was prepared as outlined in U. S. Patent 1,538,516.

What I claim is:

1. In the process of fermenting carbohydrates for the manufacture of solvents primarily butyl alcohol, the steps of applying butyl alcohol bacteria to a mash containing from about 2½% to about 15% of carbohydrates of the class consisting of starches and sugars, incorporating therewith protein material, and further incorporating therewith buffer material comprising alkaline earth salts of relatively low aliphatic acids in quantity sufficient to maintain the pH during fermentation between 4.0 and 6.5, and allowing fermentation to proceed, whereby high yields of said solvents are secured.

2. Process as in claim 1, and wherein the quantity of buffer material incorporated is such as to maintain the pH during fermentation at approximately 5.

3. In the process of fermenting carbohydrates for the manufacture of solvents primarily butyl alcohol, the steps of applying butyl alcohol bacteria to a mash containing from about 2½% to about 15% of carbohydrates of the class consisting of starches and sugars, incorporating therewith protein material, and further incorporating therewith buffer material comprising calcium salts of relatively low aliphatic acids in quantity sufficient to maintain the pH during fermentation between 4.0 and 6.5, and allowing fermentation to proceed, whereby high yields of said solvents are secured.

4. Process as in claim 3, and wherein the quantity of buffer material incorporated is such as to maintain the pH during fermentation at approximately 5.

JOSEPH A. MacDONALD.